United States Patent [19]
Della Betta et al.

[11] Patent Number: 5,405,260
[45] Date of Patent: * Apr. 11, 1995

[54] PARTIAL COMBUSTION CATALYST OF PALLADIUM ON A ZIRCONIA SUPPORT AND A PROCESS FOR USING IT

[75] Inventors: Ralph A. Della Betta, Mountain View, Calif.; Kazunori Tsurumi, Fujisawa, Japan; Toru Shoji, Sunnyvale; Robert L. Garten, Cupertino, both of Calif.

[73] Assignees: Catalytica, Inc., Mountain View, Calif.; Tanaka Kikinzoku Kogyo K.K., Japan

[*] Notice: The portion of the term of this patent subsequent to Nov. 9, 2010 has been disclaimed.

[21] Appl. No.: 97,957

[22] Filed: Jul. 27, 1993

Related U.S. Application Data

[63] Continuation of Ser. No. 617,979, Nov. 26, 1990, Pat. No. 5,259,754.

[51] Int. Cl.$^6$ .............................................. F23D 21/00
[52] U.S. Cl. .......................................... 431/7; 502/339
[58] Field of Search ........................... 431/328, 7, 170; 502/527, 262, 233, 339; 422/170, 171

[56] References Cited

U.S. PATENT DOCUMENTS

| | | | |
|---|---|---|---|
| 3,873,469 | 3/1975 | Foster et al. | |
| 3,920,583 | 11/1975 | Pugh | 252/465 |
| 3,956,188 | 5/1976 | Hindin et al. | 252/465 |
| 3,966,391 | 6/1976 | Hindin et al. | 431/7 |
| 3,969,082 | 7/1976 | Caims et al. | 23/288 |
| 3,970,435 | 7/1976 | Schultz et al. | 48/61 |
| 4,008,037 | 2/1977 | Hindin et al. | 431/2 |
| 4,019,969 | 4/1977 | Golebiowski et al. | 204/26 |
| 4,021,185 | 5/1977 | Hinden et al. | 431/7 |
| 4,088,435 | 5/1978 | Hindin et al. | 431/7 |
| 4,233,189 | 11/1980 | Gandhi et al. | |
| 4,270,896 | 6/1981 | Polinski et al. | |
| 4,279,782 | 7/1981 | Chapman et al. | 252/465 |
| 4,287,856 | 9/1981 | Enga | 122/4 |
| 4,318,828 | 3/1982 | Chapman | 252/465 |
| 4,331,631 | 5/1982 | Chapman et al. | 422/180 |
| 4,366,668 | 1/1983 | Madgavkar et al. | 60/39.06 |
| 4,414,023 | 11/1983 | Aggen et al. | 75/124 |

(List continued on next page.)

FOREIGN PATENT DOCUMENTS 2-052930  2/1990  Japan.

(List continued on next page.)

OTHER PUBLICATIONS

Pennline et al., "Operation of a Tube Wall Methanation Reactor".
Hegedus, L., "Temperature Excursions in Catalytic Monoliths".

(List continued on next page.)

Primary Examiner—Carl D. Price
Attorney, Agent, or Firm—Morrison & Foerster

[57] ABSTRACT

This invention is a catalyst comprising palladium on a support containing zirconium and a partial combustion process in which the fuel is partially combusted using that catalyst. The choice of catalysts and supports solves a problem dealing with the long term stability of palladium as a partial combustion catalyst. The catalyst structure is stable in operation, has a comparatively low operating temperature, has a low temperature a which oxidation begins, and yet is not susceptible to temperature "runaway". The combustion gas produced by the catalytic process typically is at a temperature below the autocombustive temperature and may be used at that temperature or it may be fed to other combustion stages for further use in a gas turbine, furnace, boiler, or the like.

20 Claims, 8 Drawing Sheets

U.S. PATENT DOCUMENTS

| | | | |
|---|---|---|---|
| 4,521,532 | 6/1985 | Cho | 502/439 |
| 4,601,999 | 7/1986 | Retallick et al. | 502/314 |
| 4,603,547 | 8/1986 | Pfefferle et al. | |
| 4,673,663 | 6/1987 | Magnier | 502/320 |
| 4,731,989 | 3/1988 | Furuya et al. | 60/39.05 |
| 4,742,038 | 5/1988 | Matsumoto | 502/303 |
| 4,752,599 | 6/1988 | Nakamura et al. | 502/257 |
| 4,784,984 | 11/1988 | Yamanaka et al. | 502/439 |
| 4,870,824 | 10/1989 | Young et al. | |
| 4,893,465 | 1/1990 | Farrauto et al. | 60/39.02 |
| 5,026,611 | 6/1991 | Usui | |
| 5,183,401 | 2/1993 | Dalla Betta et al. | 431/7 |
| 5,232,357 | 8/1994 | Dalla Betta et al. | 431/7 |
| 5,248,251 | 9/1994 | Dalla Betta et al. | 431/7 |

FOREIGN PATENT DOCUMENTS

| | | |
|---|---|---|
| 198948 | 11/1986 | European Pat. Off. |
| 0356197 | 10/1989 | European Pat. Off. |
| 0370244 | 10/1989 | European Pat. Off. |
| 2382584 | 3/1978 | France |
| 60-14938 | 1/1985 | Japan |
| 60-14939 | 1/1985 | Japan |
| 60-026211 | 2/1985 | Japan |
| 60-51543 | 3/1985 | Japan |
| 60-51544 | 3/1985 | Japan |
| 60-51545 | 3/1985 | Japan |
| 60-54736 | 3/1985 | Japan |
| 60-060411 | 4/1985 | Japan |
| 60-60424 | 4/1985 | Japan |
| 60-66022 | 4/1985 | Japan |
| 60-147243 | 8/1985 | Japan |
| 60-175925 | 9/1985 | Japan |
| 60-196511 | 10/1985 | Japan |
| 60-200021 | 10/1985 | Japan |
| 60-202235 | 10/1985 | Japan |
| 60-202745 | 10/1985 | Japan |
| 62-205115 | 10/1985 | Japan |
| 60-205116 | 10/1985 | Japan |
| 60-205129 | 10/1985 | Japan |
| 60-222145 | 11/1985 | Japan |
| 60-238148 | 11/1985 | Japan |
| 61-033233 | 2/1986 | Japan |
| 61-038627 | 2/1986 | Japan |
| 61-147014 | 7/1986 | Japan |
| 61-237905 | 10/1986 | Japan |
| 61-252408 | 11/1986 | Japan |
| 61-252409 | 11/1986 | Japan |
| 62-041511 | 2/1987 | Japan |
| 62-046116 | 2/1987 | Japan |
| 62-049125 | 3/1987 | Japan |
| 62-079847 | 4/1987 | Japan |
| 62-80419 | 4/1987 | Japan |
| 62-80420 | 4/1987 | Japan |
| 62-084215 | 4/1987 | Japan |
| 62-112910 | 5/1987 | Japan |
| 62-125210 | 6/1987 | Japan |
| 62-158910 | 7/1987 | Japan |
| 62-216642 | 9/1987 | Japan |
| 62-261803 | 11/1987 | Japan |
| 63-041720 | 2/1988 | Japan |
| 63-080847 | 4/1988 | Japan |
| 63-80848 | 4/1988 | Japan |
| 63-80849 | 4/1988 | Japan |
| 63-190644 | 8/1988 | Japan |

OTHER PUBLICATIONS

Kee et al., "The Chemkin Thermodynamic Data Base".

Kubaschewski et al., "Metallurgical Thermo-Chemistry".

Hayashi et al., "Performance Characteristics of Gas Turbine Combustion Catalyst Under High Pressure".

Pennline, Henry W., Richard R. Schehl, and William P. Haynes, *Operation of a Tube Wall Methanation Reactor*, Ind. Eng. Chem. Process Des. Dev.: vol. 18, No. 1, 1979.

L. Louis Hegedus, "Temperature Excursions in Catalytic Monoliths", *AIChE Journal*, Sep. 1975, vol. 21, No. 5, 849–853.

Kee et al., "The Chemkin Thermodynamic Data Base", *Sandia National Laboratory Report No. SAND87–8215*, 1987.

Kubaschewski et al., "Metallurgical Thermo-Chemistry", *International Series on Materials Science and Technology*, 5th Edition, vol. 24, 382 (No Date).

Hayashi et al., "Performance Characteristics of Gas Turbine Combustion Catalyst Under High Pressure", *Gas Turbine Society of Japan*, 1990, 18–69, 55.

PARTIAL COMBUSTION CATALYST OF PALLADIUM ON A ZIRCONIA SUPPORT AND A PROCESS FOR USING IT

This application is a continuation of application Ser. No. 07/617,979, filed Nov. 26, 1990, now U.S. Pat. No. 5,259,754.

FIELD OF THE INVENTION

This invention is a catalyst comprising palladium on a support containing zirconium and a partial combustion process in which the fuel is partially combusted using that catalyst. The choice of catalysts and supports solves a problem dealing with the long term stability of palladium as a partial combustion catalyst. The catalyst structure is stable in operation, has a comparatively low operating temperature, has a low temperature at which oxidation begins, and yet is not susceptible to temperature "runaway". The combustion gas produced by the catalytic process typically is at a temperature below the autocombustive temperature and may be used at that temperature or it may be fed to other combustion stages for further use in a gas turbine, furnace, boiler, or the like.

BACKGROUND OF THE INVENTION

With the advent of modern antipollution laws in the United States and around the world, significant and new methods of minimizing various pollutants are being investigated. The burning of fuel—be the fuel wood, coal, oil, or a natural gas—likely causes a majority of the pollution problems in existence today. Certain pollutants, such as $SO_2$, which are created as the result of the presence of a contaminant in the fuel source may be removed either by treating the fuel to remove the contaminant or by treating the exhaust gas eventually produced. Other pollutants such as carbon monoxide, which are created as the result of imperfect combustion, may be removed by post-combustion oxidation or by improving the combustion process. The other principal pollutant, $NO_x$ (an equilibrium mixture mostly of NO, but also containing very minor amounts of $NO_2$), may be dealt with either by controlling the combustion process to minimize $NO_x$ production or by later removal. Removal of $NO_x$, once produced, is a difficult task because of its relative stability and its low concentrations in most exhaust gases. One solution found in automobiles is the use of carbon monoxide chemically to reduce $NO_x$ to nitrogen while oxidizing the carbon monoxide to carbon dioxide. However, in some combustion processes (such as gas turbines) the carbon monoxide concentration is insufficient to react with and to remove to the $NO_x$.

It must be observed that unlike the situation with sulfur pollutants where the sulfur contaminant may be removed from the fuel, removal of nitrogen from the air fed to the combustion process is clearly impractical. Unlike the situation with carbon monoxide, improvement of the combustion reaction would likely increase the level of $NO_x$ produced due to the higher temperatures present in the combustion process.

Nevertheless, the challenge to reduce $NO_x$ in combustion processes remains and several different methods have been suggested. The $NO_x$ abatement process chosen must not substantially conflict with the goal for which the combustion gas was created, i.e., the recovery of its heat value in a turbine, boiler, or furnace.

Many recognize that a fruitful way of controlling $NO_x$ production in combustion processes used for turbine feed gases is to limit the localized and bulk temperatures in the combustion zone to something less than 1800° C. See, for instance, U.S. Pat. No. 4,731,989 to Furuya et al. at column 1, lines 52–59 and U.S. Pat. No. 4,088,135 to Hindin et al. at column 12.

There are a number of ways of controlling the temperature, such as by dilution with excess air, controlled oxidation using one or more catalysts, or staged combustion using variously lean or rich fuel mixtures. Combinations of these methods are also known.

One widely attempted method is the use of multistage catalytic combustion. Most of these disclosed processes utilize multi-section catalysts of metal oxide on ceramic catalyst carriers. Typical of such disclosures are:

| Country | Document | 1st Stage | 2nd Stage | 3rd Stage |
|---|---|---|---|---|
| Japan | Kokai 60-205129 | Pt-group/$Al_2O_3$ & $SiO_2$ | La/$SiO_2 \cdot Al_2O_3$ | |
| Japan | Kokai 60-147243 | La & Pd & Pt/$Al_2O_3$ | ferrite/$Al_2O_3$ | |
| Japan | Kokai 60-66022 | Pd & Pt/$ZrO_2$ | Ni/$ZrO_3$ | |
| Japan | Kokai 60-60424 | Pd/— | CaO & $Al_2O_3$ & NiO & w/noble metal | |
| Japan | Kokai 60-51545 | Pd/* | Pt/* | LaCoO$_3$/* |
| Japan | Kokai 60-51543 | Pd/* | Pt/* | |
| Japan | Kokai 60-51544 | Pd/* | Pt/* | base metal oxide/* |
| Japan | Kokai 60-54736 | Pd/* | Pt or Pt—Rh or Ni base metal oxide or LaCO$_3$/* | |
| Japan | Kokai 60-202235 | MoO$_4$/— | CoO$_3$ & ZrO$_2$ & noble metal | |
| Japan | Kokai 60-200021 | Pd & $Al_2O_3$/+* | Pd & $Al_2O_3$/** | Pt/** |
| Japan | Kokai 60-147243 | noble metal/heat resistant carrier | ferrite/heat resistant carrier | |
| Japan | Kokai 60-60424 | La or Nd/$Al_2O_3$ 0.5%$SiO_2$ | Pd or Pt/NiO & $Al_2O_3$ & CaO 0.5%SiO | |
| Japan | Kokai 60-14938 | Pd/? | Pt/? | |
| Japan | Kokai 60-14939 | Pd & Pt/refractory | ? | ? |
| Japan | Kokai 61-252409 | Pd & Pt/*** | Pd & Ni/*** | Pd & Pt/*** |
| Japan | Kokai 62-080419 | Pd & Pt | Pd, Pt & NiO | Pt or Pt & Pd |
| Japan | Kokai 62-080420 | Pd & Pt & NiO | Pt | Pt & Pd |
| Japan | Kokai 63-080848 | Pt & Pd | Pd & Pt & NiO | Pt or Pt & Pd |
| Japan | Kokai 63-080849 | Pd, Pt, NiO/? | Pd & Pt(or NiO)/? | Pt or Pd & Pt/? |

*alumina or zirconia on mullite or cordierite
**Ce in first layer; one or more of Zr, Sr, Ba in second layer; at least one of La and Nd in third layer.
***monolithic support stabilized with lanthanide or alkaline earth metal oxide
Note:
the catalysts in this Table are characterized as "a"/"b" where "a" is the active metal and "b" is the carrier It is, however, difficult to control intermediate, or between-stage, temperatures in these processes. Since the object of each of the processes is to produce a maximum amount of heat in a form which can be efficiently used in some later process, the combustive steps are essentially adiabatic. Consequently, a minor change in any of fuel rate, air rate, or operating processes will cause significant changes in the inter-stage temperatures. Very high temperatures place thermal strain on downstream catalytic elements.

This list also makes clear that platinum group metals, including palladium, are considered useful in catalytic combustion processes. However, conventional catalytic combustion processes often mix the fuel and air and then pass this mixture over a catalyst with essentially complete combustion in the catalyst bed. This results in extremely high temperatures, typically 1100° C. to 1500° C. For this reason, much of the catalyst development work is directed at catalysts and supports that can withstand those high temperatures and yet remain active. Some have relied on process control schemes in which the flow rate of an intermediate stream of air or fuel is introduced between catalyst stages and is controlled based upon bulk gas temperature. Furuya et al., mentioned above, describes one approach in circumventing the problems associated with a high catalyst temperature through dilution of the fuel/air mixture with air fed to the catalyst so that the resulting mixture has an adiabatic combustion temperature of 900° C. to 1000° C. This mixture is passed through the catalyst and partial or complete reaction gives a maximum catalyst temperature less than 1000° C. and a gas temperature less than 1000° C. Additional fuel is added after the catalyst and homogeneous combustion of this mixture gives the required temperature, 1200° C. to 1500° C. This process, however, suffers from the need to add fuel at two stages and the requirements to mix this additional fuel with hot gases without obtaining a conventional high temperature diffusion flame and the associated production of $NO_x$.

The process of our invention mixes air and fuel at the beginning of the combustor in a ratio such that the final combustion temperature is, after further combustion step or steps, that required by some later process or device which recovers the heat from the combustion gas, e.g., a gas turbine. A typical mixture might be methane and air at a volume fuel/volume air ratio of 0.043. Such a mixture (after being preheated to 350° C.) could produce a combustion temperature of about 1300° C. This mixture passes over a catalyst and is only partially combusted with the catalyst limiting the maximum catalyst temperature to a level substantially less than the adiabatic combustion temperature of the gas. The limiting effect is believed to be due to the reaction:

at the partial pressure of oxygen present during the reaction. The limiting temperature has been found to be the temperature at which the palladium/palladium oxide transition occurs in a thermogravimetric analysis (TGA) procedure. As a rule of thumb, this transition temperature for pure palladium is about 780° C. to 800° C. in air at one atm and 930° C. to 950° C. in air at ten atm.

We have found that palladium catalysts can become unstable in partial oxidation operation: the oxidation reaction dies with time and the level of preheat temperature required for stable operation increases. The solution to this problem is to place the active palladium component on a zirconia-containing support. This combination largely alleviates the instability problem.

The use of the stable temperature self-controlling feature of this invention takes place by employing one or more of the following:

a. Use of palladium (and optionally another Group VIII noble metal, such as platinum, or a Group IB metal, such as silver) as the active catalytic metals.

b. Use of a diffusion barrier applied over the catalyst surface to limit the rate at which the fuel diffuses to the catalyst and, therefore, limits the catalytic reaction rate and allows palladium to limit the maximum temperature.

c. Use of a zirconia-containing support (preferably, in turn, on a metal substrate) to support the catalyst layer and provide a catalyst structure very resistant to thermal shock.

The interconversion of palladium oxide and palladium at approximately 800° C. has been described previously, for example, by Furuya et al. in U.S. Pat. No. 4,731,989. However, this patent describes this interconversion as a disadvantage since the active palladium oxide species is converted to a less active palladium species thus preventing the combustion reaction from going to completion on the catalyst. The inventive process herein uses this palladium oxide/palladium interconversion process on a support stabilized with zirconia to limit the catalyst temperature and thereby permit the use of very high activity and stable catalysts.

By maintaining the catalyst temperature at a level substantially below the adiabatic combustion temperature, problems associated with thermal sintering of the catalyst, vaporization of the palladium, and thermal shock of the support can be minimized or eliminated.

The use of metal catalyst supports for platinum group metals has been suggested in passing. For instance, see U.S. Pat. No. 4,088,435 to Hindin et al., "platinum group metals" at column 4, lines 63 et seq., and "the support may be metallic or ceramic . . . " at column 6, line 45. Conversely, the use of a platinum group alloy monolithic catalyst as a combustion catalyst is suggested in U.S. Pat. No. 4,287,856 to Hindin et al. at column 1, line 65 et al. Other similar disclosures are found in the earlier U.S. Pat. Nos. 3,966,391; 3,956,188; 4,008,037; and 4,021,185 all to Hindin et al. Platinum on a steel ("Fecralloy") support as a combustion catalyst for low heating value gas is suggested in U.S. Pat. No. 4,366,668 to Madgavkar et al.

Other disclosures of metals and metal supports used mainly for automotive catalytic converters include:

| Country | Document | Patentee |
|---|---|---|
| U.S. | 3,920,583 | Pugh |
| U.S. | 3,969,082 | Cairns et al. |
| U.S. | 4,279,782 | Chapman et al. |
| U.S. | 4,318,828 | Chapman et al. |
| U.S. | 4,331,631 | Chapman et al. |
| U.S. | 4,414,023 | Aggen et al. |
| U.S. | 4,521,532 | Cho |
| U.S. | 4,601,999 | Retallick et al. |
| U.S. | 4,673,663 | Maqnier |
| U.S. | 4,742,038 | Matsumoto |
| U.S. | 4,752,599 | Nakamura et al. |
| U.S. | 4,784,984 | Yamanaka et al. |
| Great Britain | 1,528,455 | Cairns et al. |

As a group, these patents generally discuss ferritic catalyst supports upon which alumina is found as microcrystals, coatings, whiskers, etc. Many disclose that platinum group metals are suitably placed on those supports as catalysts. None suggest the ability of a catalyst comprising palladium on a zirconia-containing support stably to limit the catalyst temperature.

Moreover, in a practical sense the use of metal substrates has been limited to applications where the adiabatic combustion temperature is below 1100° C. or 1000° C. where the complete combustion of the fuel/air mixture will result in a substrate temperature that would not damage the metal. This limitation caps the final gas temperature that can be achieved or requires the use of staged fuel or air addition further complicating the combustor design. The use of the inventive process limits the metal substrate temperature to less than 850° C. at one atm pressure and to less than 950° C. at 16 atm pressure even for fuel/air mixtures with adiabatic combustion temperatures up to 1500° C.

Our inventive process for stably limiting the substrate temperature also offers advantage for ceramic substrates since limiting the substrate temperature reduces thermal stress and failure due to thermal shock during start up and shutdown of the combustor. This protection is especially important for fuel/air ratios corresponding to adiabatic combustion temperatures of 1300° C. to 1600° C.

In summary, although the literature suggests various unrelated portions of the inventive process and the catalyst structure, none of these documents suggests that certain palladium catalysts having a zirconium-containing support can offer advantage by stably limiting the substrate temperature.

SUMMARY OF THE INVENTION

This invention is a combustion catalyst comprising palladium (optionally with a Group IB or VIII noble metal) and a support comprising zirconium. The invention includes a partial combustion process in which the fuel is partially combusted using that catalyst. The choice of catalysts and supports solves a problem in the art dealing with the long term stability of palladium as a partial combustion catalyst: The catalyst structure is stable in operation, has a comparatively low operating temperature, has a low "light off" temperature, and yet is not susceptible to temperature "runaway". The combustion gas produced by the catalytic process may be at a temperature below the autocombustive temperature, may be used at that temperature, or fed to other combustive stages for further use in a gas turbine, furnace, boiler, or the like.

DESCRIPTION OF THE INVENTION

Figure 1A:
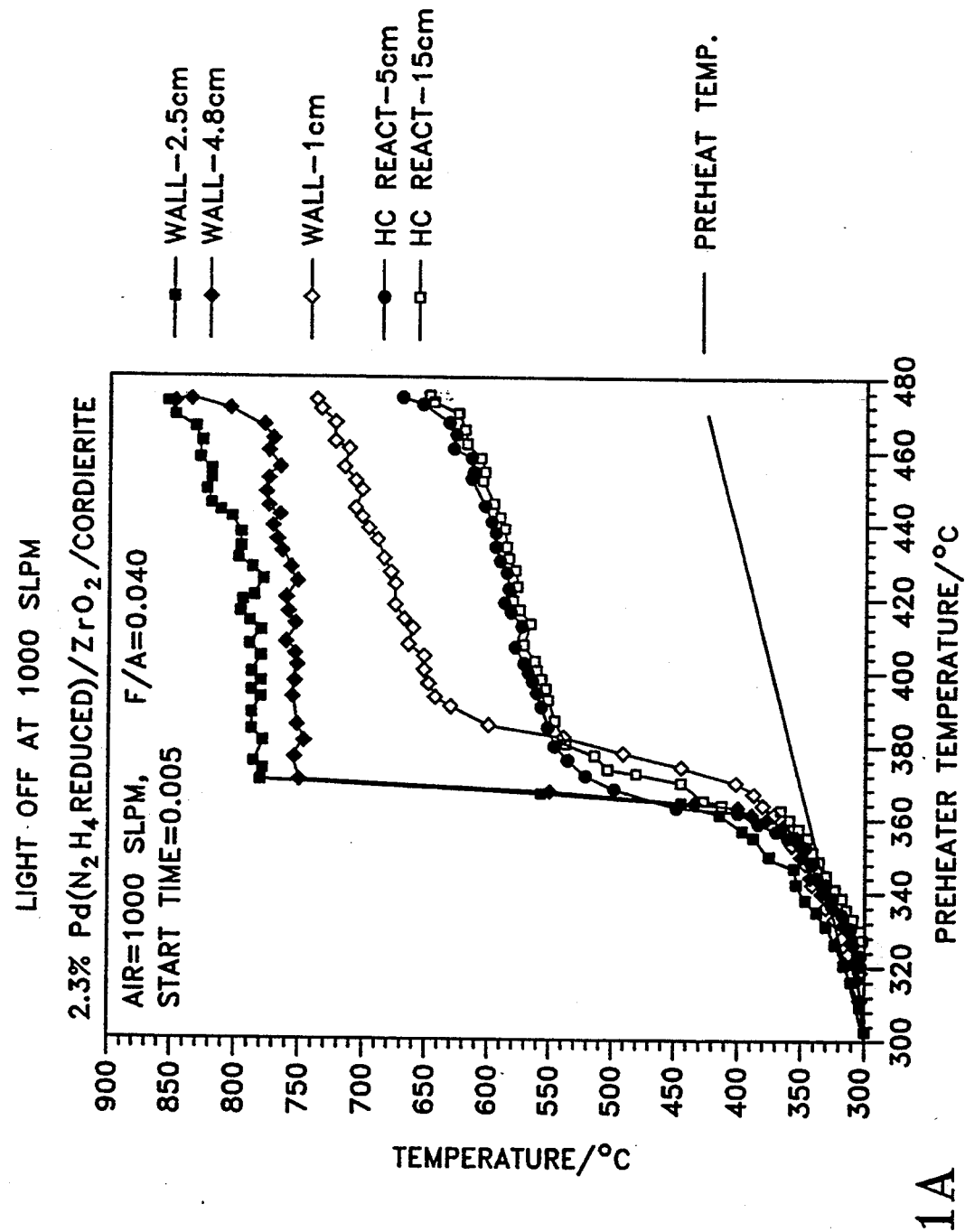
FIGS. 1-A and 1-B are temperature graphs showing operation of the invention using a zirconia coated ceramic support.

This invention is a combustion catalyst comprising palladium (optionally with a Group IB or VIII noble metal) and a support comprising zirconium. The invention includes a partial combustion process in which the fuel is partially combusted using that catalyst. The choice of catalysts and supports solves a problem in the art dealing with the long term stability of palladium as a partial combustion catalyst. The catalyst structure is stable in operation, has a comparatively low operating temperature, has a low "light off" temperature, and yet is not susceptible to temperature "runaway". The combustion gas produced by the catalytic process may be at a temperature below the autocombustive temperature, may be used at that temperature, or fed to other combustive stages for further use in a gas turbine, furnace, boiler, or the like.

Catalyst and Catalytic Structures

The catalyst contains palladium and, optionally, one or more Group VIII noble metal (platinum, ruthenium, rhodium, osmium, or iridium; preferably platinum) or Group IB metal (preferably silver) in an amount no more than equimolar to palladium. Palladium is fairly active as an oxidation catalyst at temperatures of 325° C. and lower and consequently is useful in a partial combustion process as a "light off" catalyst. As was discussed above, the catalytic activity of palladium as a fuel oxidation catalyst is believed to be due to the presence of palladium oxide. Palladium metal does not appear to be a very active as a catalyst except at fairly high temperatures, e.g., above 750° C. to 800° C. Palladium metal is readily oxidized to palladium oxide in the presence of excess oxygen at temperatures as low as 325° C. according to the equilibrium reaction:

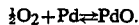

$$\tfrac{1}{2}O_2 + Pd \rightleftharpoons PdO.$$

However, as the temperature rises, the equilibrium shifts to the left, i.e., the palladium oxide decomposes. This transition causes the reaction temperature to be self-limiting. In one atm pressure air the combustion goes readily up to a temperature of about 750° C. to 800° C., the palladium oxide becomes the lesser present species, and the reaction consequently slows.

The temperature at which palladium oxide converts to palladium depends in part on the oxygen partial pressure and that conversion temperature appears to be readily determinable through TGA (a procedure that measures the weight loss of palladium oxide as the temperature increases). The transition point establishes the self-limiting substrate temperature for those operating conditions. A palladium catalyst used as a combustion catalyst will generally limit the substrate temperature to this TGA transition limiting temperature.

We have found however that the use of palladium on some substrates, notably those containing alumina, results in a partial oxidation catalyst having an unpredictable life. The reason for the deactivation is unclear although the resulting decline in outlet temperature may be quite pronounced. The effect is observed on both alumina coated metal supports and with neat aluminas. We disclosed in U.S. patent application entitled "A PLATINUM-PALLADIUM PARTIAL COMBUSTION CATALYST AND A PROCESS FOR USING IT" U.S. patent application Ser. No. 08/011,107, filed on Jan. 29, 1993 that the addition of a discrete amount of a Group VIII noble metal or Group IB metal (such as platinum or silver) to the palladium catalyst provides long term stability to the catalyst composition and does not substantially affect the desirable low "light off" temperatures found with palladium catalysts. We have also found that the use of a catalyst support comprising zirconium (preferably in the form of zirconia) also stabilizes the steady-state operation of palladium-based partial oxidation catalysts.

The palladium metal is added in an amount sufficient to provide catalytic activity. The specific amount added depends on a number of requirements, e.g., the fuel used, economics, activity, life, contaminant presence, etc. The theoretical maximum amount of metal is likely enough to cover the maximum amount of support without causing undue metal crystallite growth and concomitant loss of activity. These clearly are competing factors: maximum catalytic activity requires higher surface coverage but higher surface coverage can promote growth between adjacent crystallites. Furthermore, the form of the catalyst support must be considered. If the support is used in a high space velocity environment, the catalyst loadings should be high to maintain sufficient conversion even though the residence time is low. Economics has, as its general goal, the use of the smallest amount of catalytic metal which will do the required task. Finally, the presence of contaminants in the fuel would mandate the use of higher catalyst loadings to offset deterioration in the catalyst due to deactivation.

The palladium metal content of this catalyst composite is typically quite small, e.g., from 0.01% to about 25% by weight. The amount also is affected by the make up of the feed.

The palladium may be incorporated onto the support in a variety of different methods using palladium complexes, compounds, or dispersions of the metal. The compounds or complexes may be water or hydrocarbon soluble. The palladium metal may be precipitated from solution. The liquid carrier generally needs only to be removable from the catalyst carrier by volatilization or decomposition while leaving the palladium in a dispersed form on the support. Examples of the palladium complexes and compounds suitable in producing the catalysts used in this invention are palladium chloride, palladium diammine dinitrite, palladium nitrate, palladium tetrammine chloride, sodium palladium chloride, palladium 2-ethylhexanoic acid, and a variety of other palladium salts or complexes. Although the chloride compounds produce catalysts which are typically quite active, chlorides are not an excellent choice when the catalyst is used in a combustor for a gas turbine. Chlorides, even in very small amounts, cause significant turbine blade and bucket corrosion. Consequently, nitrogen-containing palladium precursors are most desirable.

As mentioned above, the catalyst may contain an adjunct catalyst such as a Group IB metal (such as silver) or a Group VIII noble metal (such as platinum) in an amount up to slightly more than the molar amount of the platinum found in the catalyst composition. Molar ratios of the palladium to adjunct metal between 0.95 and 25 are effective. Although the adjunct metal may be added by inclusion in the liquid carrier containing the palladium as a complex, compound, or metallic dispersion, the resulting catalyst is more predictably stable if the adjunct metal is added in a subsequent step. Examples of platinum complexes and compounds suitable in producing the optional catalysts of this invention are platinum chloride, platinum diammine dinitrite, platinum nitrate, platinum tetrammine chloride, sodium platinum chloride, and a variety of other platinum salts or complexes. Similar salts and complexes are known for the other Group VIII noble metals or Group IB metals.

The preferred supports for this catalyst are metallic. Metallic supports in the form of honeycombs, spiral rolls of corrugated sheet (which may be interspersed with flat separator sheets), columnar (or "handful of straws"), or other configurations having longitudinal channels or passageways permitting high space velocities with a minimal pressure drop are desireable in this service. They are malleable, can be mounted and attached to surrounding structures more readily, and offer lower flow resistance due to the thinner walls than can be readily manufactured in ceramic supports.

Another practical benefit attributable to metallic supports is the ability to survive thermal shock. Such thermal shocks occur in gas turbine operations when the turbine is started and stopped and, in particular, when the turbine must be rapidly shut down. In this latter case, the fuel is cut off or the turbine is "tripped" because the physical load on the turbine—e.g, a generator set—has been removed. Fuel to the turbine is immediately cut off to prevent overspeeding. The temperature in the combustion chambers (where the inventive process takes place) quickly drops from the temperature of combustion to the temperature of the compressed air. This drop could span more than 1000° C. in less than one second. In any event, the catalyst is deposited (or otherwise placed) on the walls within the channels or passageways of the metal support in the amounts specified above. Several types of support materials are satisfactory in this service: aluminum, aluminum containing or aluminum-treated steels, and certain stainless steels or any high temperature metal alloy, including cobalt or nickel alloys where a catalyst layer can be deposited on the metal surface.

The preferred materials are aluminum-containing steels such as those found in U.S. Pat. Nos. 4,414,023 to Aggen et al., 4,331,631 to Chapman et al., and 3,969,082 to Cairns, et al. These steels, as well as others sold by Kawasaki Steel Corporation (River Lite 20-5 SR), Vereinigte Deutchse Metallwerke AG (Alumchrom I RE), and Allegheny Ludlum Steel (Alfa-IV) contain sufficient dissolved aluminum so that, when oxidized, the aluminum forms alumina whiskers or crystals on the steel's surface to provide a rough and chemically reactive surface for better adherence of the washcoat.

The steels (after alumina whiskers formation) are treated with a zirconium-containing compound or, preferably, a suspension or sol of zirconium oxide or hydrated zirconium oxide. The palladium compounds and any other catalyst precursors typically are applied to the zirconia coating although the zirconium coating may be formulated to incorporate the palladium. The washcoat of zirconium may be applied using one or more coats of zirconia sols or sols of mixed oxides containing silicon or titanium and additives such as barium, cerium, lanthanum, chromium, or a variety of other components. After application of the suspension, it may be dried and calcined to form a high surface area adherent oxide layer on the metal surface.

The washcoat may be applied in the same fashion one would apply paint to a surface, e.g., by spraying, direct application, dipping the support into the washcoat material, etc. An alternative process for adding the catalyst layer to the support structure is first to add the catalytic metals to the inert oxide powder. The catalyst metal is fixed on the oxide by heat treatment or by chemical treatment. The palladium/inert oxide mixture may then be milled to form a colloidal sol. The sol is applied to the substrate by spraying, dipping, or the like.

Aluminum structures are also suitable for use in this invention and may be treated or coated in essentially the same manner. Aluminum alloys are somewhat more ductile and likely to deform or even to melt in the temperature operating envelope of the process. Consequently, they are less desireable supports but may be used if the temperature criteria can be met.

Once the washcoat, palladium, and any adjunct catalytic metals have been applied to the metallic support and calcined, one or more coatings of a refractory oxide may then be applied as a diffusion barrier to prevent the temperature "runaway" discussed above. This barrier layer may be silica, zirconia, titania, or a variety of other oxides with a low catalytic activity for oxidation of the fuel or mixed oxides or oxides plus additives similar to those described for the washcoat layer. Alumina likely is not desirable as the barrier layer but may be acceptable in some circumstances. The barrier layer may range in thickness from 1% of the washcoat layer thickness to a thickness substantially thicker than the washcoat layer, preferably from 10% to 100% of the washcoat layer thickness. The preferred thickness will depend on the operating conditions of the catalyst, including the fuel type, the gas flow velocity, the preheat temperature, and the catalytic activity of the washcoat layer. It has also been found that the application of the diffusion barrier coating only to a downstream portion of the catalyst structure, e.g., 30% to 70% of the length, can provide sufficient protection for the catalyst under certain conditions. As with the washcoat, the barrier layer or layers may be applied using the same application techniques one would use in the application of paint.

The washcoat, catalyst, and diffusion or barrier coat may be applied to all surfaces of a catalyst support such as described herein, or may be applied only to a surface opposite a non-coated surface. For instance, the spiral corrugated structure noted above may be coated on one side with the washcoat, catalyst, and diffusion barrier coat. The treated corrugated structure may then be rolled into a monolith. A separator sheet of similar material may also be coated on one side with the catalytic material and rolled along with the corrugated sheet into the spiral monolith. In any event, the surface in the monolith having the catalyst placed thereon produces heat during the combustion process. This heat may pass to the gas flowing by or may be conducted through the catalyst structure to the adjacent non-catalytic—and hence, cooler—surface. From there the heat would pass into the non-combusted gas passing along that surface. This allows control of the temperature of the catalytic surface of the catalyst structure by an integral heat exchange without resorting to such measures as air dilution or extraneous heat exchange structures. Such a control might be desireable where, for instance, the preheat temperature of the inlet gas is quite high and the gas flow rate is unstable.

This catalyst structure should be made in such a size and configuration that the average linear velocity of the gas through the longitudinal channels in the catalyst structure is greater than about 0.2 m/second throughout the catalytic structure and no more than about 40 m/second. This lower limit is greater than the flame front speed for methane and the upper limit is a practical one for the type of supports currently commercially available. These average velocities may be somewhat different for fuels other than methane.

The Process

This process may be used with a variety of fuels and at a broad range of process conditions.

Although normally gaseous hydrocarbons, e.g., methane, ethane, and propane, are highly desireable as a source of fuel for the process, most carbonaceous fuels capable of being vaporized at the process temperatures discussed below are suitable. For instance, the fuels may be liquid or gaseous at room temperature and pressure. Examples include the low molecular weight aliphatic hydrocarbons mentioned above as well as butane, pentane, hexane, heptane, octane; gasoline; aromatic hydrocarbons such as benzene, toluene, ethylbenzene, and xylene; naphthas; diesel fuel and kerosene; jet fuels; other middle distillates; heavier fuels (preferably hydrotreated to remove nitrogenous and sulfurous compounds); oxygen-containing fuels such as alcohols including methanol, ethanol, isopropanol, butanol, or the like; and ethers such as diethylether, ethyl phenyl ether, MTBE, etc. Low-BTU gases such as town gas or syngas may also be used as fuels.

The fuel is typically mixed into the combustion air in an amount to produce a mixture having an adiabatic combustion temperature greater than the temperature achieved by this inventive process. Preferably the adiabatic combustion temperature is above 900° C., most preferably above 1000° C. Non-gaseous fuels should be at least partially vaporized prior to their contacting the catalyst zone. The combustion air may be at atmospheric pressure or lower ($-0.25$ atm) or may be compressed to a pressure of 35 atm or more. Stationary gas turbines, which ultimately could use the gas produced by this process, often operate at gauge pressures in the range of eight atm to 35 atm. Consequently, this process may operate at a pressure between $-0.25$ atm and 35 atm, preferably between zero atm and 17 atm.

The fuel/air mixture supplied to the catalyst should be well mixed and the gas inlet temperature may be varied depending on the fuel used. This temperature may be achieved by preheating the gas through heat exchange or by adiabatic compression.

The process uses a catalytic amount of a palladium-containing material on a catalyst, preferably metal, support with low resistance to gas flow having a zirconium-containing coating. The bulk outlet temperature of the partially combusted gas leaving the zone containing the catalyst and the wall temperature of the catalyst will be at temperatures significantly lower than the adiabatic or autocombustive temperature of the gas. Generally, neither temperature will be more than about 800° C., preferably no greater than 550° C. to 650° C. In addition, the catalyst temperature should not exceed 1000° C. and preferably not exceed 950° C. These temperatures will depend on a variety of factors including the pressure of the system, the partial pressure of the oxygen, the calorific value of the fuel, and the like. Nevertheless the catalyst will partially oxidize the fuel but will limit the ultimate temperature to a value lower than the adiabatic combustion temperature.

EXAMPLES

These examples show the production of catalysts within the scope of the invention and its use in the inventive process. Comparative catalysts and processes are also shown.

The catalysts are tested for two parameters: stability during steady-state operation and "light off temperature" (LOT).

The LOT is determined by placing the catalyst in the combustion reactor and initiating a flow of fuel and air to the catalyst. Although these tests were conducted at atmospheric pressure, others are conducted at higher pressure. The temperature of the gas/air mixture is increased at a constant rate. The temperature of the gas leaving the catalyst and the temperatures at several points in the catalyst are monitored. If the catalyst is active, at some point during this temperature increase, the catalyst will begin to oxidize the fuel and an increase in both the outlet gas temperature and the intermediate catalyst will be observed. For ease of comparison, the LOT is the average temperature between the preheat temperature and the self-limiting temperature value.

The stability of the catalyst is determined by measuring the temperatures at the same points in the catalyst and gas stream as in the LOT determination but after an appropriate (and non-varying) preheat temperature for the mixture of fuel and air is chosen.

Example 1

This example shows the production of a palladium catalyst on a zirconia coated cordierite support.

A polymer lined ball mill was loaded with 125 g of $ZrO_2$ powder (having a surface area of 95 $m^2$/gm), 211 ml water, and 15 ml of concentrated nitric acid. The mill was filled with $ZrO_2$ media and the mixture milled for eight hours.

$Pd(NH_3)_2(NO_2)_2$ was dissolved in nitric acid to form a solution containing 0.083 g palladium/ml. Forty-two ml of this palladium solution was added to 50 g of the $ZrO_2$ colloidal sol, the pH adjusted to 9.0, and 1.0 g of hydrazine added. This solution was stirred until the palladium was completely reduced. This sol contained 20% palladium by weight.

A cordierite, monolithic honeycomb 50 mm in diameter and 50 mm long with 100 square cells per square inch was dipped in the palladium/$ZrO_2$ sol, the excess sol blown out of the honeycomb channels with air, dried, and calcined at 850° C. This process was repeated until the monolith contained 12% palladium/$ZrO_2$. The final catalyst contained 2.3% palladium by weight and the washcoat had a surface area of 26 $m^2$/gm.

Example 2

The catalyst of Example 1 was placed in a two inch I.D. insulated section of a combustion reactor. Air at 1000 Standard Liters Per Minute (SLPM) was passed through a heater, a static gas mixer, and then through the catalyst. Natural gas was introduced into the air stream just upstream of the gas mixer. Gas temperatures were measured before and after the catalyst by thermocouples suspended in the gas stream. The catalyst substrate temperature was measured by use of thermocouples which had been placed in channels at positions of 25 mm and 48 mm from the inlet and sealed with ceramic cement.

Natural gas at 40 SLPM was introduced into the air stream and the air temperature increased to 400° C. The catalyst substrate temperature rose to about 750° C. and stabilized. The outlet gas temperature remained at 560° C. These temperatures were very stable for the 3.5 hour duration of the test.

Figure 1B:
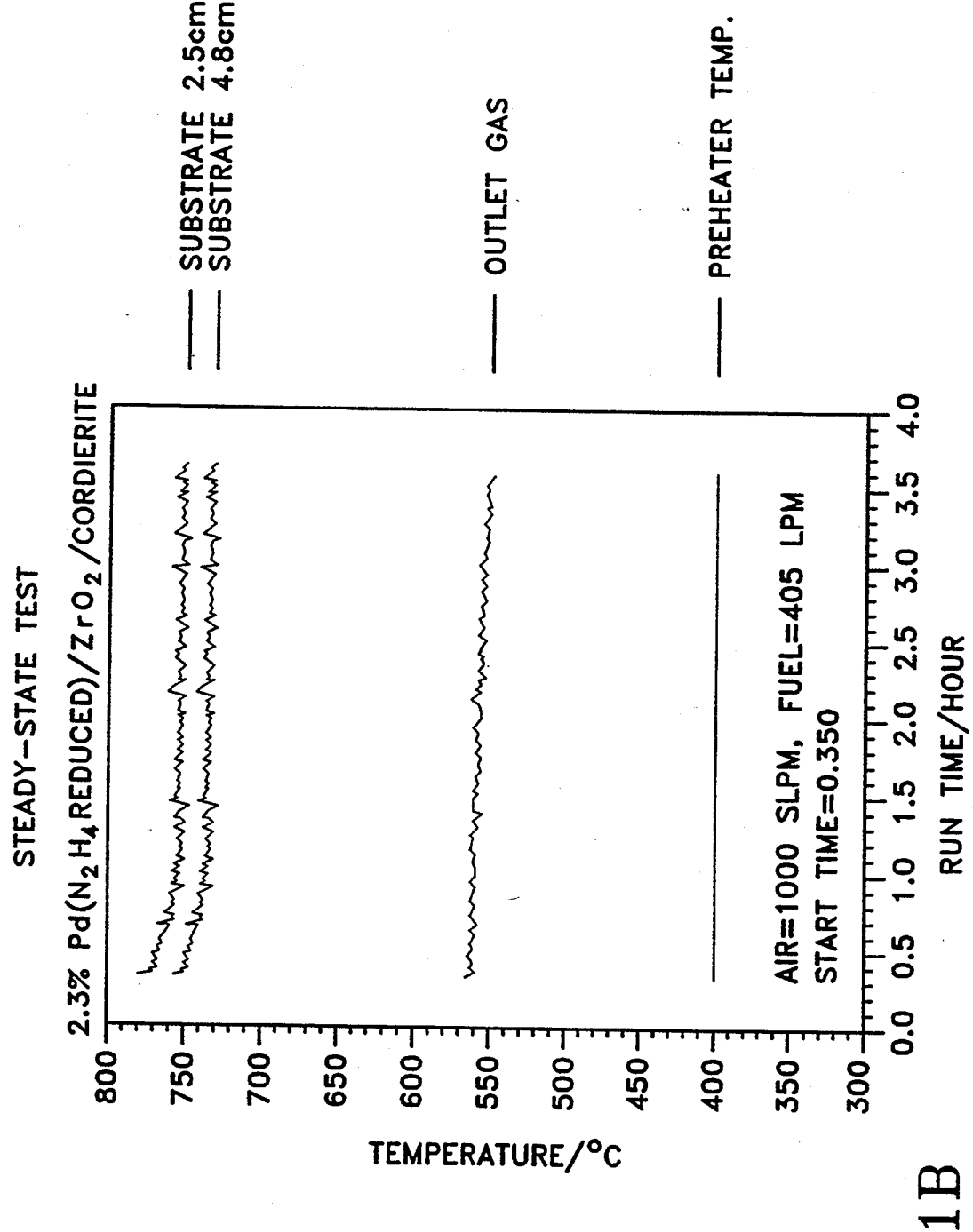

The LOT data and the steady state run data are shown in FIGS. 1A and 1B, respectively.

Example 3

This comparative example shows the production of an alumina supported catalyst.

A very high purity alumina containing less than 50 ppm total impurities was ball milled as in Example 1 above. A $Pd(HN_3)_2(NO_2)_2$ solution was added and reduced with hydrazine (also as described in Example 1) to form a palladium/$Al_2O_3$ sol containing 20% palladium by weight. A cordierite monolith was coated to produce a final catalyst containing 11% palladium/$Al_2O_3$ and 2.2% palladium by weight. The final washcoat had a surface area of 50 $m^2$/gm.

Example 4

Figure 2A:
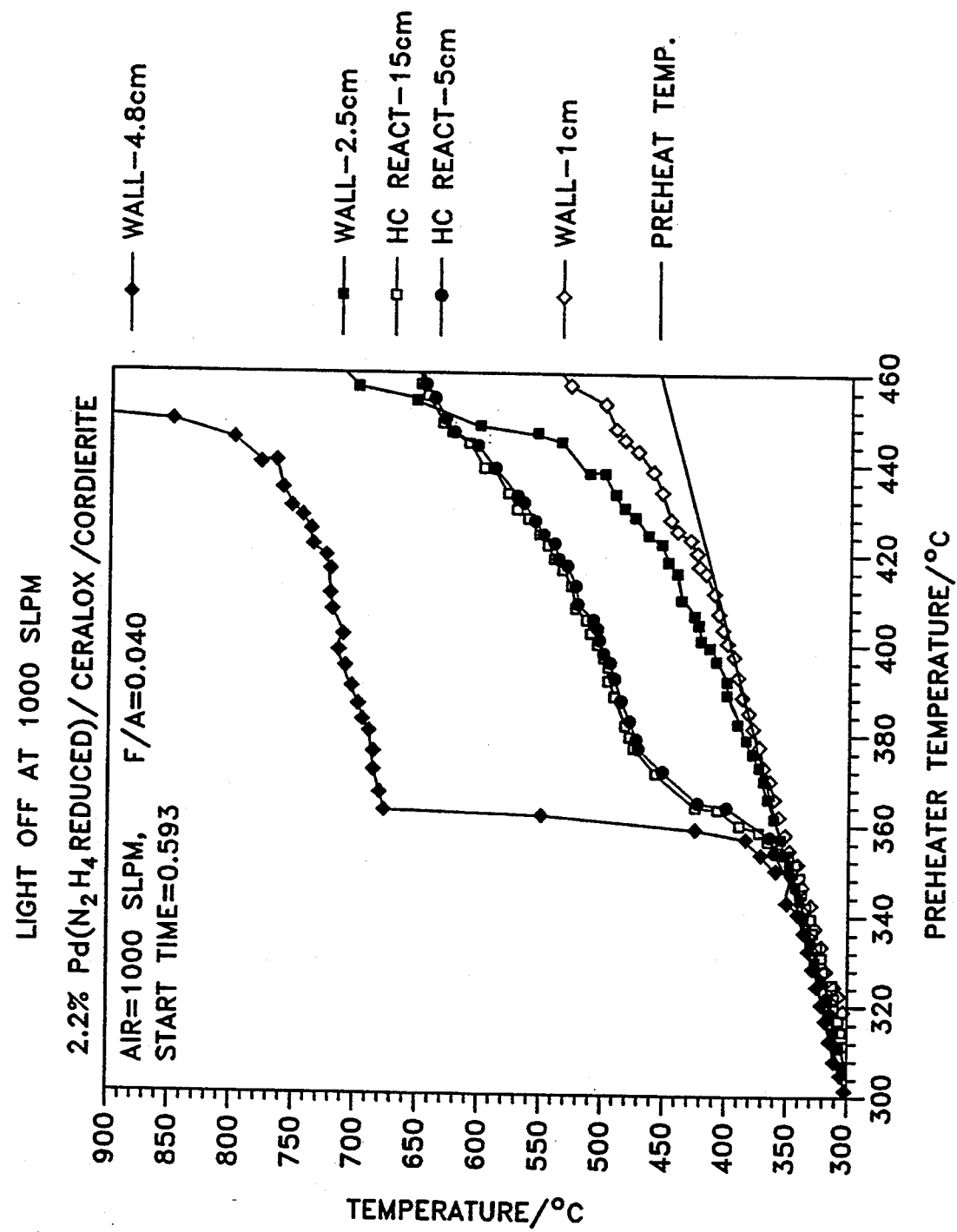
FIGS. 2-A and 2-B are temperature graphs for comparison to FIGS. 1-A and 1-B.
Figure 2B:
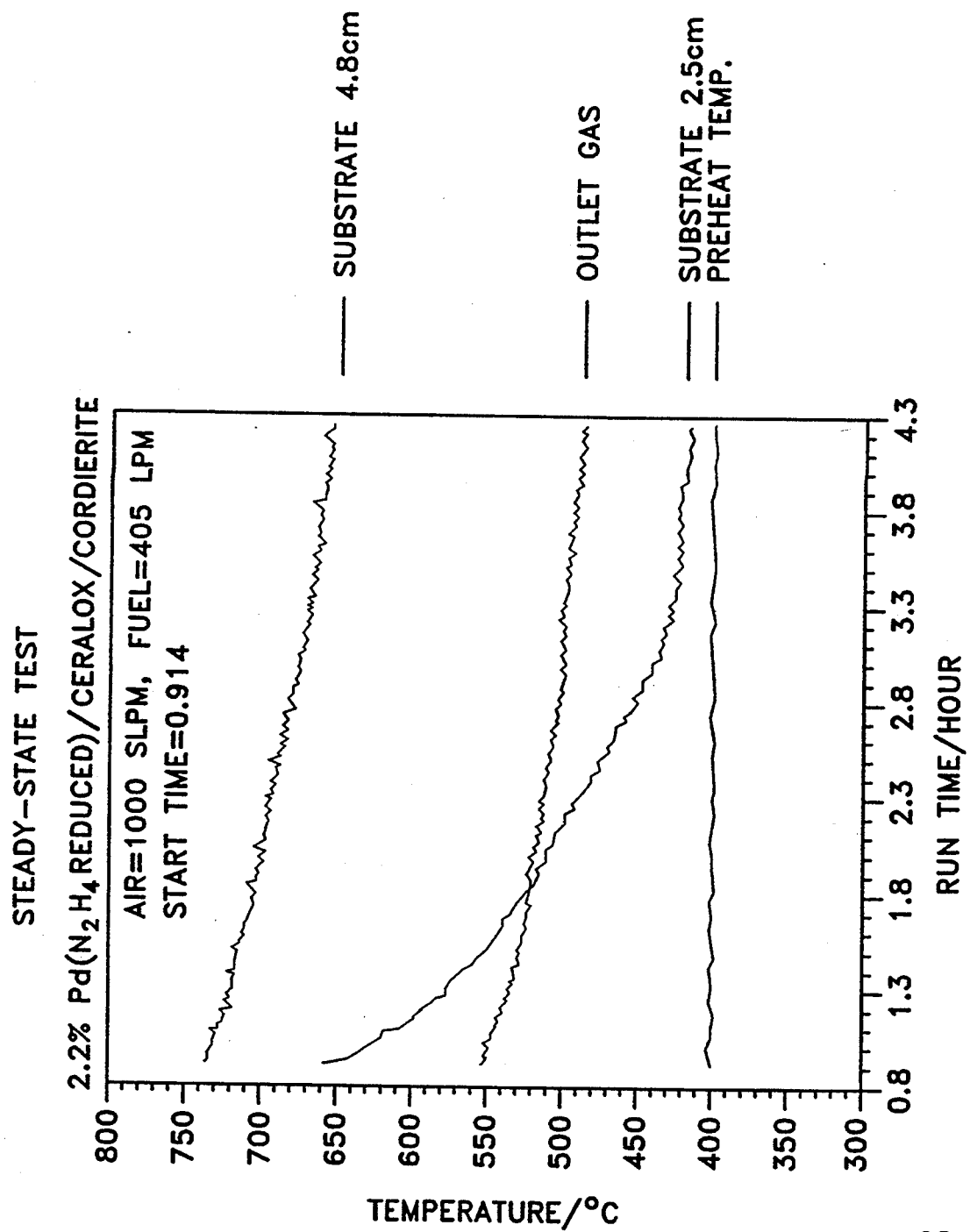

The catalyst prepared in Example 3 was tested as described in Example 2. The catalyst was tested both for LOT (FIG. 2A) and for steady state performance (FIG. 2B). The steady state performance at a preheat of 400° C. (FIG. 2-B) shows rapid deactivation of the catalyst with the substrate temperatures dropping to 420° C. at the center of the catalyst and the outlet gas temperature dropping from 560° C. to 485° C. in only three hours.

The catalysts tested respectively in Examples 2 and 4 have similar loadings and preparation procedures. The alumina supported catalyst tested in Example 4 has a higher surface area and might be expected to be more active. However, the palladium/$Al_2O_3$ catalyst deactivates very rapidly. This suggests that $Al_2O_3$ is a less appropriate support for palladium in catalytic combustion catalysts; $ZrO_2$ is much preferred.

Example 5

This example shows the production of a corrugated metal foil honeycomb substrate having a zirconia coating.

A $ZrO_2$ colloidal sol was prepared as follows. About 66 g of zirconium isopropoxide was hydrolyzed with 75 cc water. It was then mixed with 100 g of $ZrO_2$ powder having a surface area of 100 $m^2$/gm and an additional 56 ml water. This slurry was ball milled in a polymer lined ball mill using $ZrO_2$ cylindrical grinding media for eight hours. This colloidal sol was diluted to a concentration of 15% $ZrO_2$ by weight with additional water.

An Fe/Cr/Al metal foil was corrugated in a herringbone pattern and then oxidized at 900° C. in air to form alumina whiskers on the foil surface. The $ZrO_2$ sol was sprayed onto one side of the corrugated foil. The coated foil was then dried and calcined at 850° C. The final foil contained 2.0 mg $ZrO_2$/$cm^2$ foil surface.

Palladium 2-ethylhexanoic acid was dissolved in toluene to a concentration of 0.1 g palladium/ml. This solution was sprayed onto the $ZrO_2$ coated metal foil and the foil dried and calcined at 850° C. in air. The final foil contained about 0.5 mg palladium/$cm^2$ of foil surface.

The corrugated foil was rolled so that the corrugations did not mesh to form a final metal structure of two inch diameter and two inch length with longitudinal channels running axially through the structure.

Example 6

Figure 3A:
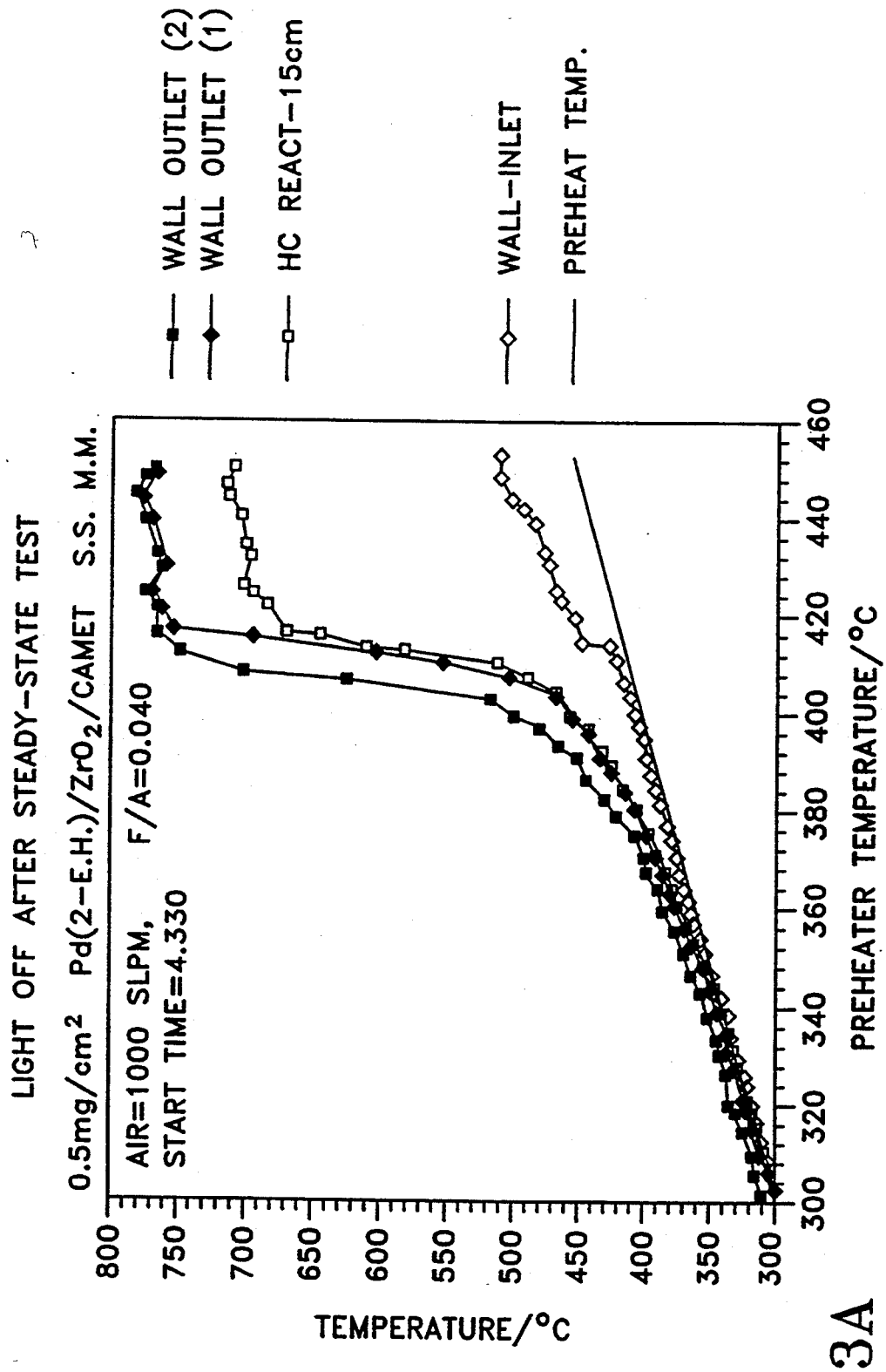
FIGS. 3-A and 3-B are temperature graphs showing operation of the invention using a zirconia coated metal support.
Figure 3B:
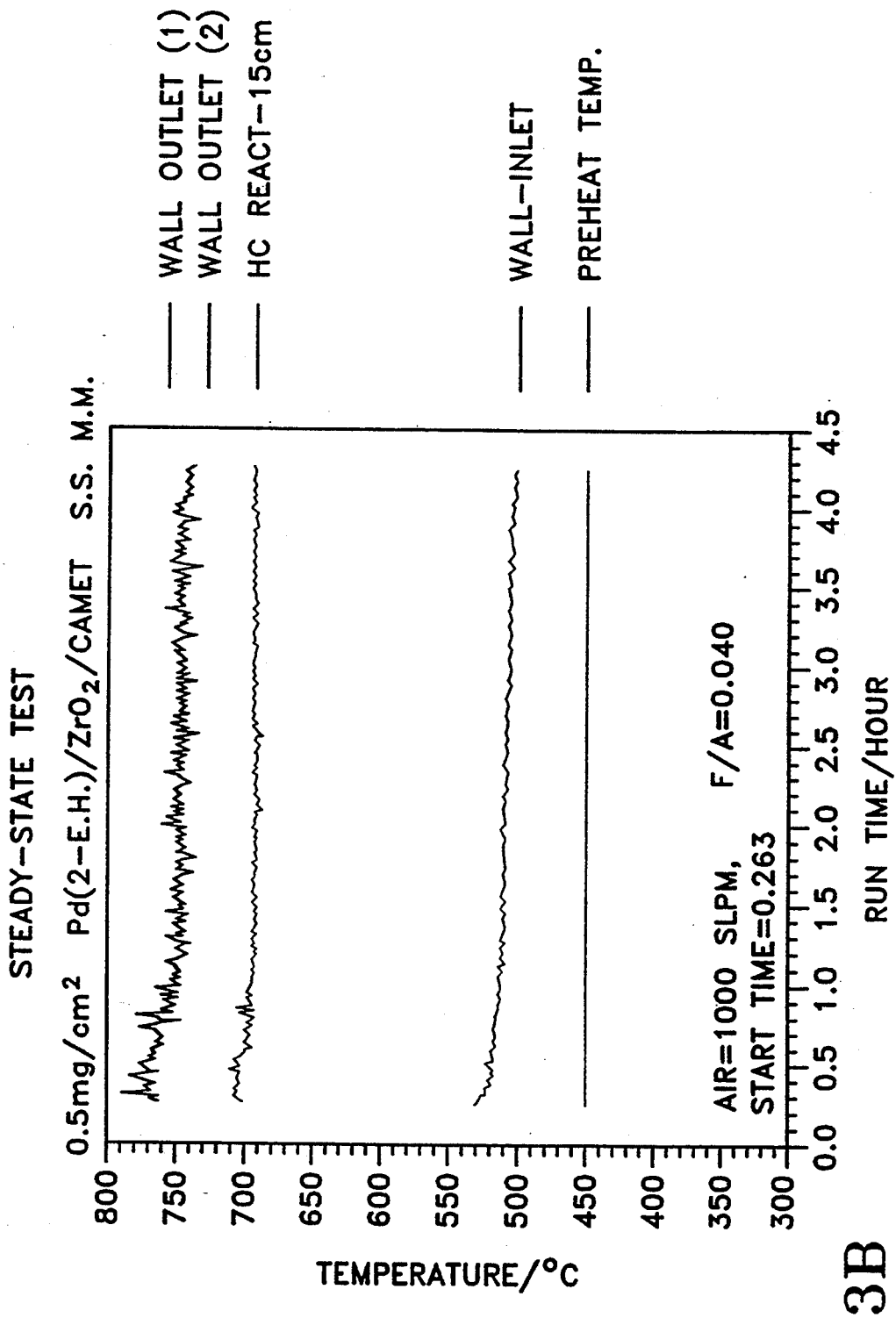

The catalyst of Example 5 was placed in the combustion reactor described in Example 2 and tested for LOT and steady state operation. The air flow rate was 1000 SLPM, the methane rate was 40 SLPM, and the steady state preheat temperature was 450° C. The performace of this catalyst is shown in FIG. 3A and 3B.

Example 7

This catalyst was prepared to be similar to Example 5 but using $Al_2O_3$ as the support.

An $Al_2O_3$ sol was prepared. A polymer lined ball mill was loaded with 250 g of gamma alumina, 422 ml water, and 21 ml of concentrated nitric acid. Cylindrical zirconia media was added and the mixture milled for eight hours.

This alumina sol was diluted to about 15% solids with water, sprayed onto a corrugated metal foil (as in Example 5), and calcined at 850° C. for ten hours. The final $Al_2O_3$ loading was 2.2 mg/cm$^2$.

A palladium 2-ethylhexanoic acid solution was sprayed onto the $ZrO_2$ coated metal foil and the foil dried and calcined at 850° C. in air. The final foil contained about 0.5 mg palladium/cm$^2$ of foil surface.

Example 8

Figure 4A:
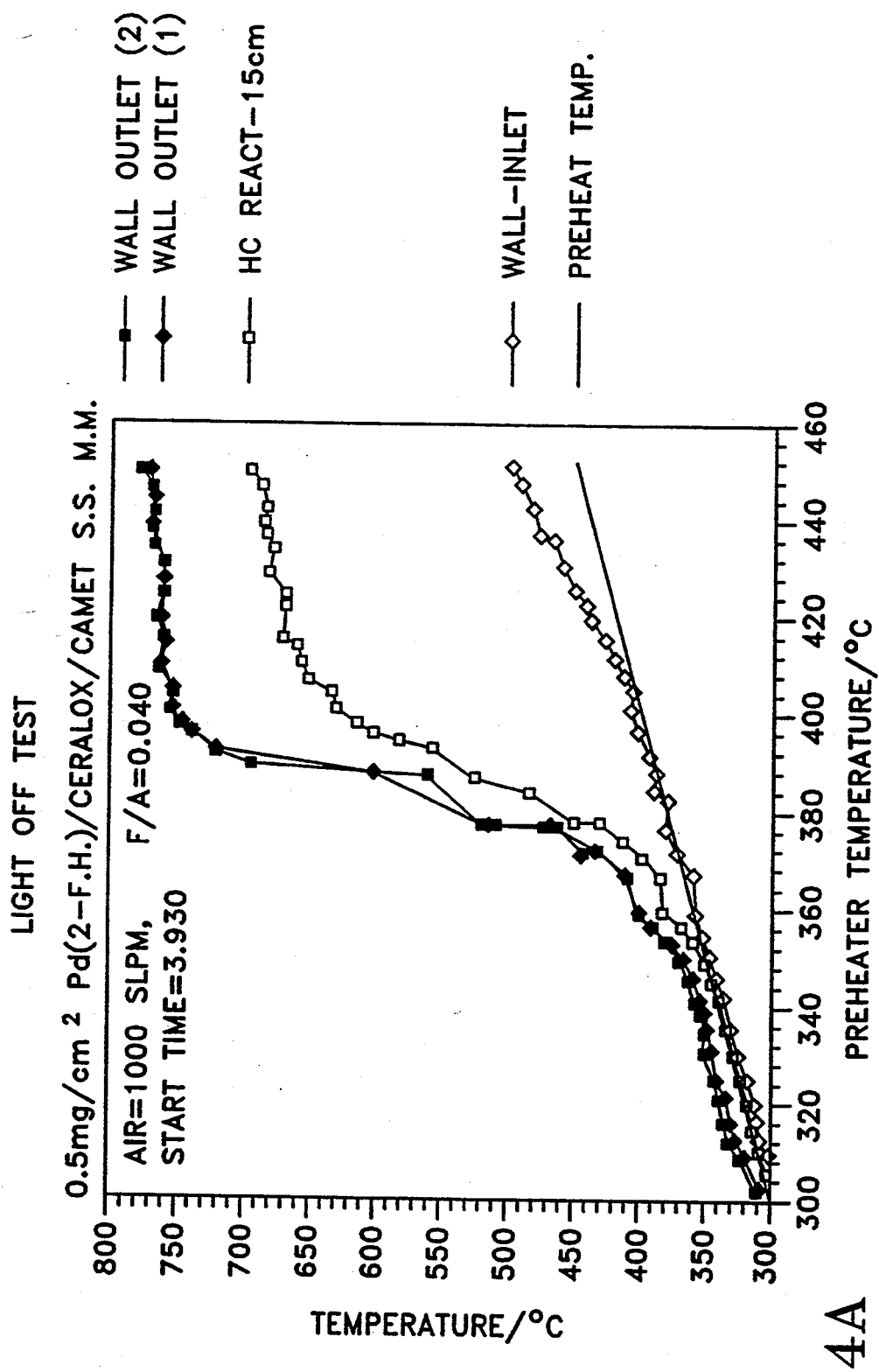
FIGS. 4-A and 4-B are temperature graphs for comparison to FIGS. 3-A and 3-B.
Figure 4B:
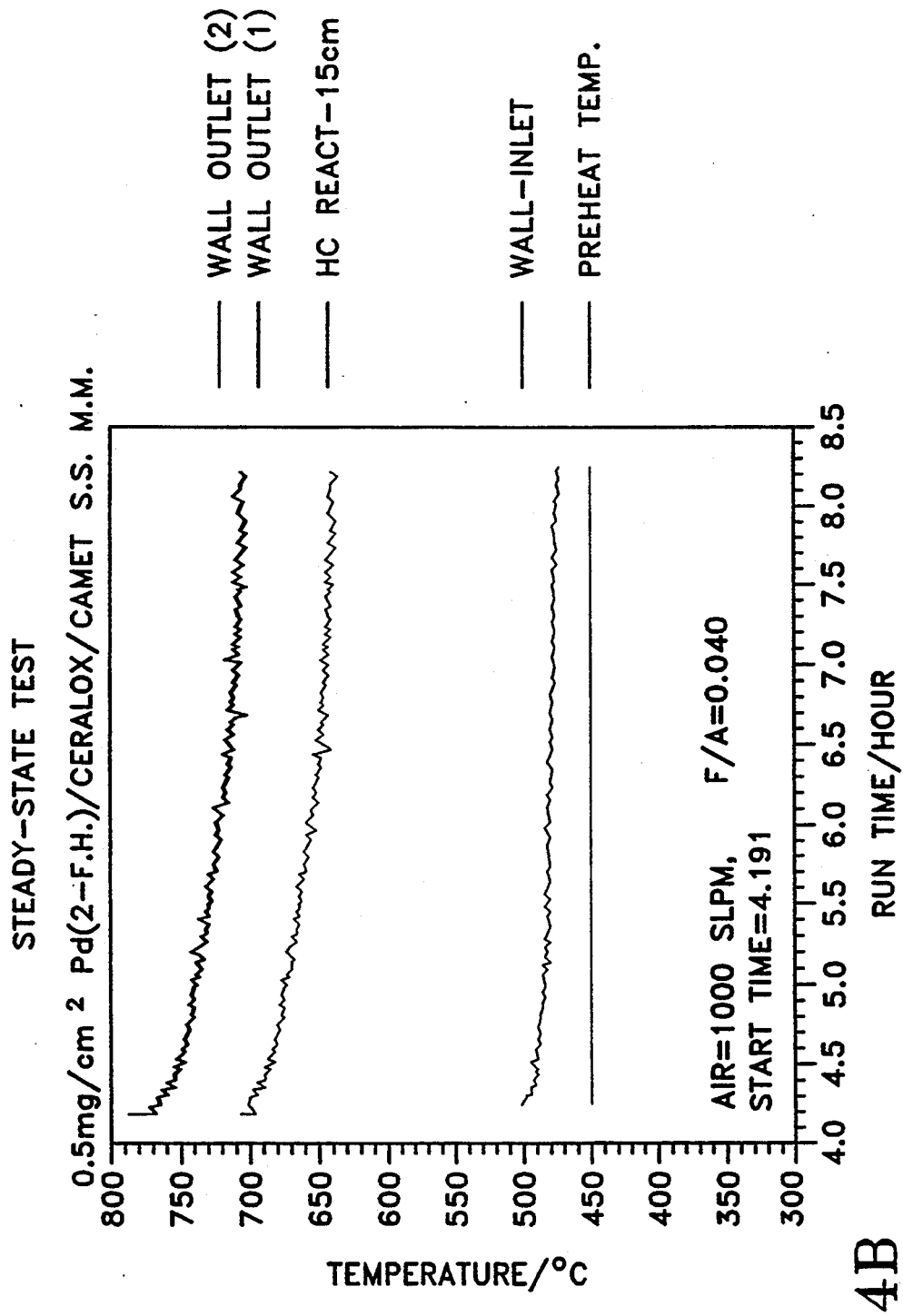

The catalyst from Example 7 was placed in the reactor described above and tested. The air flow rate was 1000 SLPM, the natural gas flow rate was 40 SLPM, and the steady state preheat temperature was 450° C. The performance of this catalyst is shown in FIGS. 4A and 4B. The palladium/$ZrO_2$ shows substantially improved stability over the catalyst containing alumina.

The invention has been disclosed both by description and by the use of examples. The examples are only examples and must not be used to limit the invention in any way. Furthermore one having ordinary skill in this art would be able to determine equivalents to the invention described here but outside the literal scope of the appended claims. We also consider those equivalents to be part of our invention.

We claim as our invention:

1. A partial combustion process comprising the steps of:
   a. mixing an amount of an oxygen containing gas with a combustible fuel to produce a combustible gas mixture having an adiabatic combustion temperature, and
   b. passing the combustible gas mixture into a combustion zone containing a catalyst configuration comprising palladium on a coated aluminum-containing metallic catalyst support wherein the coating is comprised of a zirconium compound and the catalyst support has longitudinal passageways for the passage and partial combustion of the combustible gas mixture to produce a partially combusted exhaust gas having a bulk temperature and a catalyst temperature less than the adiabatic combustion temperature of the combustible gas mixture.

2. The process of claim 1 where the catalyst support additionally comprises a material selected from the group of metal and a metal having an oxide coating.

3. The process of claim 2 where the catalyst support comprises a ferrous alloy.

4. The process of claim 3 where the catalyst support comprises a ferrous alloy coated by a non-catalytic oxide, a refractory metal oxide, or mixtures thereof.

5. The process of claim 4 where the palladium is at least partially covered by a diffusion layer comprising a catalytically inactive oxide.

6. The process of claim 5 where the diffusion barrier comprises zirconia.

7. The process of claim 5 where the diffusion layer is a washcoat.

8. The process of claim 2 where the catalyst is at least partially covered by a diffusion barrier comprising a catalytically inactive oxide.

9. The process of claim 8 where the diffusion barrier comprises zirconia.

10. The process of claim 8 where the diffusion barrier layer is a washcoat.

11. The process of claim 2 where the catalyst support having longitudinal passageways is in the form of a honeycomb, tubes, or rolled corrugation.

12. The process of claim 11 where only a portion of the longitudinal passageway surfaces contain catalyst.

13. The process of claim 12 where the portion of the longitudinal passageways surfaces containing catalyst are adjacent to passageway surfaces not containing palladium and those surfaces are in integral heat exchange relationship to each other.

14. The process of claim 1 where the combustible fuel is selected from liquid fuels, gaseous fuels, oxygen containing fuels, and mixtures.

15. The process of claim 14 where the liquid fuels are selected from vaporizable fuels.

16. The process of claim 14 where the gaseous fuels are selected from the group consisting of methane, ethane, ethylene, propane, and propylene.

17. The process of claim 14 where the oxygen-containing fuels comprise $C_1$–$C_5$ alcohols, ethers, or mixtures.

18. The process of claim 1 where the combustible gas comprises methane and the combustible gas mixture is passed into the partial combustion zone at a temperature of at least about 325°0 C.

19. The process of claim 18 where the partial combustion zone has a gauge pressure between −0.25 atm and 35 atm.

20. The process of claim 19 where the gauge pressure is between zero atm and 17 atm.

* * * * *

UNITED STATES PATENT AND TRADEMARK OFFICE
CERTIFICATE OF CORRECTION

PATENT NO. : 5,405,260
DATED : April 11, 1995
INVENTOR(S) : Ralph A. Dalla Betta, et. al.

It is certified that error appears in the above-indentified patent and that said Letters Patent is hereby corrected as shown below:

Title page, items [19] and [75], inventor's name "Della Betta et al." should read-- Dalla Betta et al.

Column 14, line 47, claim 18, delete "325°0 C" and substitute therefor-- 325° C--.

Signed and Sealed this

Twelfth Day of September, 1995

Attest:

BRUCE LEHMAN

*Attesting Officer*          *Commissioner of Patents and Trademarks*